Figure 1:
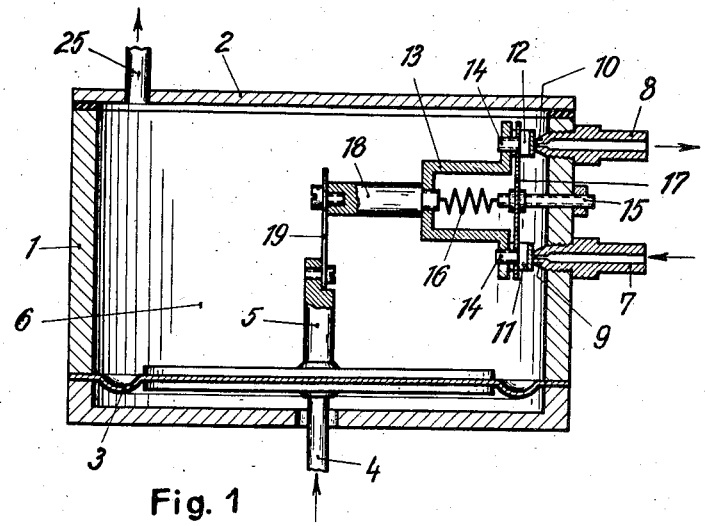

March 4, 1958     G. KLEE     2,825,308

FLUID PRESSURE RELAY

Filed April 2, 1953     3 Sheets-Sheet 1

Inventor:
Gerhard Klee
By
Atty.

March 4, 1958  G. KLEE  2,825,308
FLUID PRESSURE RELAY
Filed April 2, 1953  3 Sheets-Sheet 2

Inventor:
Gerhard Klee
By Gustav H. Emery, Atty.

March 4, 1958  G. KLEE  2,825,308
FLUID PRESSURE RELAY
Filed April 2, 1953  3 Sheets-Sheet 3

Inventor:
Gerhard Klee
By Gustav N. Emery Atty.

United States Patent Office 2,825,308
Patented Mar. 4, 1958

2,825,308

FLUID PRESSURE RELAY

Gerhard Klee, Frankfurt am Main, Germany, assignor to Samson Apparatebau Akt.-Ges., Frankfurt am Main, Germany Application April 2, 1953, Serial No. 346,506

Claims priority, application Germany April 5, 1952

5 Claims. (Cl. 121—46.5)

This invention relates to a fluid pressure relay which serves to convert into a hydraulic or pneumatic pressure a physical quantity such for example as temperature pressure, differential pressure, liquid level or the like represented by a measuring force, each value of the quantity corresponding to a definite pressure of the pressure medium concerned.

It is known for this purpose to cause the measuring force to act on a measuring diaphragm which is under the opposing influence of a liquid or gaseous pressure medium such for example as compressed air. This measuring diaphragm actuates, in accordance with the value of the measuring force, a relay which by means of nozzle valves or the like controls the inflow and outflow of the pressure medium into and out of the pressure chamber of the housing of the diaphragm. This pressure, the value of which corresponds to the value at the time of the measuring force and therefore to the original quantity, can be indicated or recorded for example by a manometer, or employed for other measuring or control purposes.

An object of the invention is to improve and to simplify fluid pressure relays of this kind with regard to construction, manner of operation and applications.

Other objects and many of the attendant advantages of this invention will be readily appreciated as the same becomes better understood by reference to the following detailed description when considered in connection with the accompanying drawing.

Some forms of the invention are illustrated by way of example in the drawing.

Figure 2:
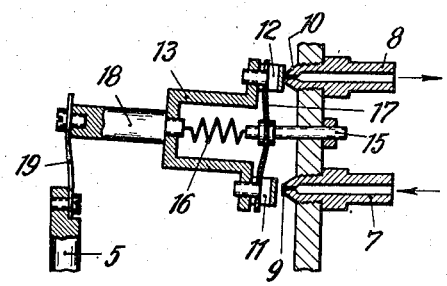
Figure 3:
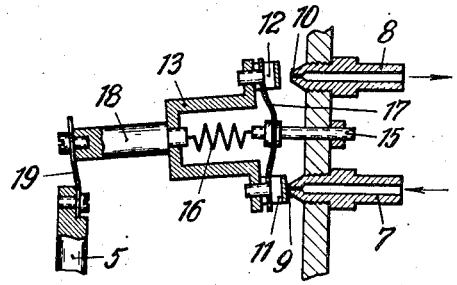
Figure 4:
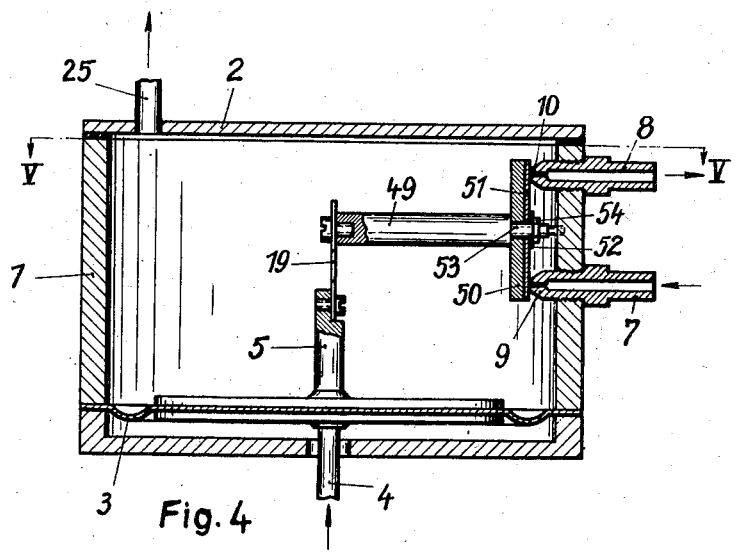
Figure 5:
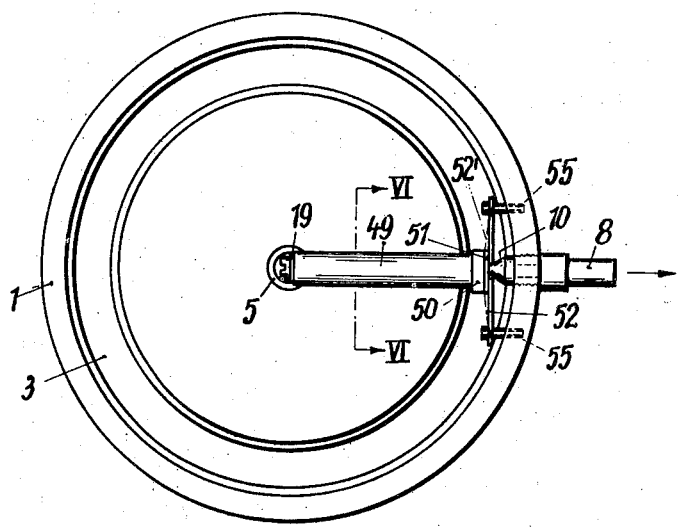
Figure 6:
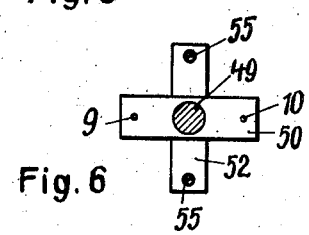

Fig. 1 shows diagrammatically in longitudinal section a fluid pressure relay,

Figs. 2 and 3 show the relay itself with the inlet and outlet nozzle respectively open, Fig. 4 shows diagrammatically in longitudinal section another form of the fluid pressure relay, Fig. 5 shows a sectional view of the relay taken on line V—V of Fig. 4, Fig. 6 shows a sectional view of the tilting lever mechanism taken on line VI—VI of Fig. 5, and Figs. 7 to 10 show diagrammatically various applications of the fluid pressure relay.

The fluid pressure relay illustrated in the drawing is mounted in a pot shaped housing 1 which is closed at the top by a removable cover 2 and at the bottom by a measuring diaphragm 3. The term "measuring diaphragm" used in the description and claims includes not only flat diaphragms of rubber, artificial material and so on, but also spring tube capsules made from metallic tubes or the like. Preferably a flat diaphragm having a central stiffening disc is employed. The measuring diaphragm 3 may be provided underneath with an operating rod 4 which projects out of the diaphragm housing and to which is applied the measuring force generated by the magnitude to be converted. On its inner side the measuring diaphragm 3 carries a pin 5 which projects into the pressure chamber 6 enclosed by the housing 1, cover 2 and the measuring diaphragm 3.

According to Figs. 1 to 6 there are screwed into the side wall of the housing 1 two nozzles 7 and 8 arranged parallel and at a predetermined lateral distance from one another, of which the inlet nozzle 7 is connected to a pipe for pressure medium, e. g. a compressed air pipe whilst the outlet nozzle 8 is connected to a pipe which is not under pressure or which leads to atmosphere.

Opposite the orifices 9 and 10 of the nozzle 7 and 8 respectively which project into the pressure chamber 6 is mounted a tilting lever which is provided with corresponding nozzle-closure surfaces 11 and 12 respectively and this lever according to Figs. 1 to 3 consist of a U-shaped frame 13. The frame 13 carries at the ends of its legs, which are bent outwardly like feet, the closure surfaces 11 and 12 which are for example rubber discs, which are preferably adjustable by means of screws 14 and likewise may be mounted in a linked manner in order to ensure normal application to the nozzle orifices 9, 10. The tilting lever frame 13 is pulled by a spring 16 stretched between the bridge of the frame and a fixed pin 15 so that its closure surfaces 11, 12 are drawn towards the orifices 9, 10 of the nozzles 7, 8 the spring, however, permitting tilting movements of the frame 13 either about the nozzle orifice 9 or about the nozzle orifice 10. In order to prevent linear displacement of the frame 13 and to ensure pure tilting movements, the outturned ends of the frame 13 are connected by a leaf spring 17 with the fixed pin 15.

The tilting lever frame 13 is operated at right angles to the mean direction of stroke of the closure members 11 and 12, by the measuring diaphragm 3. For this purpose there is secured on the bridge, i. e. on the free end of the lever arm formed by the legs of the tilting lever, a linked arm 18 which by means of a preferably resilient link, for example of a leaf spring 19, is connected with the diaphragm pin 5. By extending or shortening the intermediate arm 18 and at the same time in some cases displacing the tilting lever and nozzle system to the left or right, the lever ratio and therewith the valve stroke can be altered between certain limits.

The measuring force, which is transmitted from the rod 4 to the measuring diaphragm 3, may be exerted by any suitable magnitude or control quantity. The fluid pressure relay converts this force into a hydraulic or pneumatic pressure which can be transmitted, via a pressure pipe 25 connectable to the cover 2, to an indicating manometer 26 and/or to a recording manometer 27 or to any other measuring or control instruments.

Figure 7:
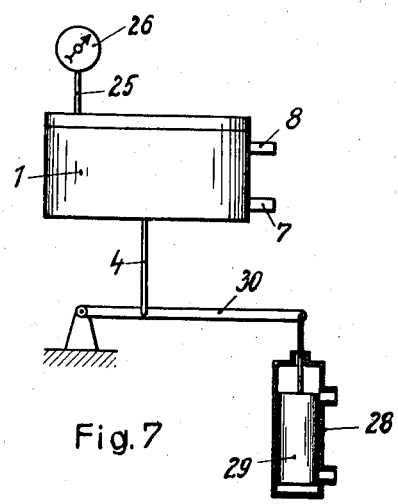

Figure 7 shows by way of example the conversion of the liquid level in a vessel 28 into a pressure. The liquid exerts on a float 29 an upward force varying according to its level. This force is transmitted via a lever 30 to the diaphragm rod 4 and converted by the fluid pressure relay 1 into a pressure, the value of which at any time corresponds exactly to the upward force exerted on the float 29. The calibration of the manometer 26 can, therefore, be given directly in terms of liquid level, in centimetres, for example.

Figure 8:
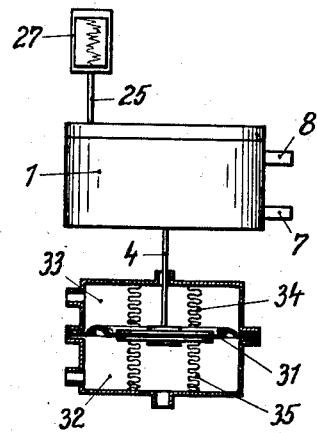
Figure 9:
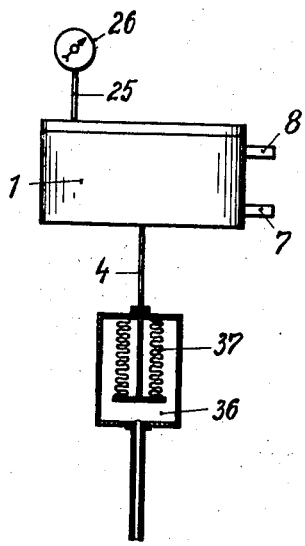

Fig. 8 illustrates the conversion of a differential pressure existing, for example, in a venturi tube or the like into a pressure. On a differential pressure diaphragm 31 there acts for example positive pressure from the lower chamber 32 and negative pressure from the upper chamber 33. The force exerted on the differential pressure diaphragm 31 is transmitted via two equally large resilient tubes 34, 35, communicating with the atmosphere, to the diaphragm rod 4 and converted into a pressure by the fluid pressure relay as above described.

Figure 8 shows diagrammatically the conversion of a high pressure, for example 10 atmospheres, which acts in a pressure chamber 36 on a spring tube 37, into a lower pressure, for example 1 atmosphere. The pressure indicated by the manometer 25 always has a definite relation to the existing value of the high pressure.

Figure 10:
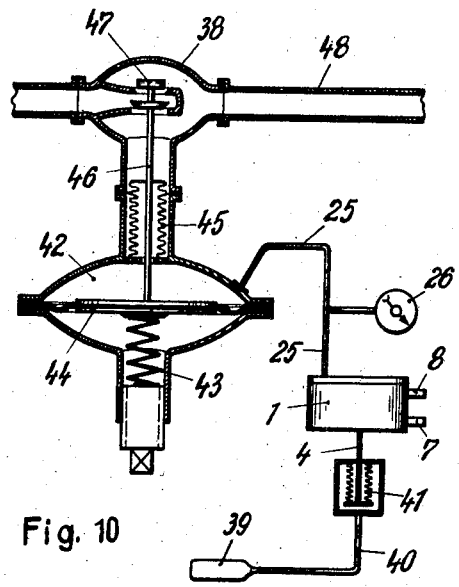

Finally, Figure 10 illustrates the conversion of a temperature into a pressure which may be employed for the adjustment of a temperature regulating valve 38. A capsule 39 is filled with an easily vaporisable liquid which according to the temperature exerts varying vapour pressure on a spring tube 41 via a capillary tube 40 and adjusts the rod 4 of the fluid pressure relay 1. To the pressure pipe 25 is connected in addition to the manometer 26 the pressure pulse chamber 42 of a working diaphragm 44 loaded by an adjustable spring 43. This working diaphragm 44 actuates, via a valve rod 46 enclosed in air-tight manner by a spring tube 45, the double seat valve member 47 of the control valve 38 which is included in a pipe 48. Since a different temperature at the capsule 39 corresponds to a different pressure in the pressure chamber of the fluid pressure relay the working diaphragm 44 of the control valve 38 adjusts itself in accordance with this pressure and also adjusts correspondingly the prevailing temperature.

Normally, the fluid pressure relays constructed, for example, in accordance with Figures 1 to 3 are in the balanced condition illustrated in Figure 1 in which the inlet nozzle 7 and the outlet nozzle 8 are both closed. If now the force acting via the rod 4 on the centre of gravity of the measuring diaphragm 3 is increased, for example, in consequence of increase in the temperature to be measured, then the measuring diaphragm 3 exerts on the tilting lever frame 13, via the pin 5 and the leaf spring 19, a tilting moment which acts upwardly and tilts the tilting lever frame 13 out of the position illustrated in Fig. 1 and into the position shown in Fig. 2. Thereby the orifice 9 of the inlet nozzle 7 is uncovered and compressed air, for example, penetrates into the pressure chamber 6 whereby the pressure in the magnitude converter is correspondingly increased. Thereby the measuring diaphragm 3 is again pressed downwardly until the internal pressure is balanced by the new measuring force. The tilting lever frame 13 is then tilted back into its former position as in Fig. 1, both nozzles 7 and 8 are closed and the balanced condition is again established. With a decrease in the measuring force on the diaphragm rod 4, the reverse sequence occurs, i. e. the measuring diaphragm sinks under the action of the internal pressure and tilts the tilting lever 13 into the position illustrated in Fig. 3. Now the outlet nozzle 8 is opened and the inlet nozzle 7 is closed and compressed air can flow from the pressure chamber 6, so that the internal pressure falls correspondingly and the measuring diaphragm 3 can again rise until the balanced condition is established.

Correspondingly, according to the employment of the apparatus the value to be measured is adjusted or indicated or the required measuring or control operation is effected.

A magnitude converter according to Figs. 4 to 6 operates correspondingly so that a detailed description of the operation thereof is unnecessary.

The relay may have the simplified form illustrated in Figs. 4 to 6 in which it consists of a flat plate 50 having at its centre a tilting lever 49 at right angles to the plate. Instead of two nozzle closure surfaces there is in this case a single closure surface 51 which extends over the under surface of the whole tilting lever plate 50, this closure surface 51 consisting for example of a rubber layer stuck to the tilting lever plate. This has the advantage that the closure surfaces lie with certainty exactly in one plane.

The leaf spring may also be constructed as a torsion leaf spring as shown at 52 in Figs. 4 to 6. This torsion leaf spring 52 is fixed on the housing 1 at both ends for example by means of screws 55 and is connected at the centre by means of a nut 54 which the screwed portion 53 of the tilting lever 49. The pretensioning imparted to this leaf spring is indicated by the broken line 52' in Figure 5.

I claim:

1. A fluid pressure relay, comprising a pressure chamber, a pressure conduit connected with the said pressure chamber, a pressure fluid inlet nozzle for said chamber, a pressure fluid outlet nozzle for said chamber, said nozzles projecting through a wall of said chamber with their orifices into the interior of said chamber parallel and laterally spaced from one another, a lever plate tiltably mounted in said pressure chamber, means for applying a force to be converted into a fluid pressure to said tiltable lever plate, said lever plate having closure surface zones adapted to cooperate with said nozzle orifices, said orifices being both closed by said closure surface zones of said lever plate in the balanced condition of said relay and being alternatively opened and closed by said closure surface zones of said lever plate tiltable under the control of said force, and a leaf spring anchored in said pressure chamber, said lever plate being tiltably held by the leaf spring.

2. A fluid pressure relay according to claim 1, in which said leaf spring is centrally anchored in said pressure chamber, the ends of said leaf spring engaging said lever plate in the regions of said closure surface zones.

3. A fluid pressure relay according to claim 1, in which said leaf spring is torsionally anchored in said pressure chamber, a part of said leaf spring capable of being torsionally turned being connected to said tiltable lever plate.

4. A fluid pressure relay according to claim 1, in which said leaf spring is arranged crosswise to said lever plate, both the ends of said leaf spring being anchored in said pressure chamber and its center being connected to said tiltable lever plate.

5. A fluid pressure relay according to claim 1, in which said leaf spring is pre-tensioned whereby to urge said closure surface zones of said tiltable lever plate towards the said nozzle orifices.

References Cited in the file of this patent

UNITED STATES PATENTS

| 1,145,601 | Lemoine | July 6, 1915 |
| 1,319,241 | Nassen | Oct. 21, 1919 |
| 1,611,961 | Thompson | Dec. 28, 1926 |
| 1,938,492 | Moller | Dec. 5, 1933 |
| 2,138,714 | Swartzwelder | Nov. 29, 1938 |
| 2,342,696 | Rover | Feb. 29, 1944 |
| 2,354,814 | Joesting | Aug. 1, 1944 |
| 2,374,945 | Minter | May 1, 1945 |
| 2,476,030 | Everington | July 12, 1949 |
| 2,612,908 | Tate | Oct. 7, 1952 |
| 2,619,104 | Temple | Nov. 25, 1952 |
| 2,724,398 | Higgins | Nov. 22, 1955 |
| 2,725,068 | Howe | Nov. 29, 1955 |

FOREIGN PATENTS

| 560,459 | Great Britain | Apr. 5, 1944 |